(12) United States Patent
Scifo et al.

(10) Patent No.: US 12,194,798 B1
(45) Date of Patent: Jan. 14, 2025

(54) SUSPENSION FOR A MOTOR VEHICLE

(71) Applicant: FERRARI S.P.A., Modena (IT)

(72) Inventors: Alfredo Scifo, Modena (IT); Mauro Giordani, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/756,441

(22) Filed: Jun. 27, 2024

Related U.S. Application Data (63) Continuation of application No. 18/386,788, filed on Nov. 3, 2023.

(30) Foreign Application Priority Data

Jul. 4, 2023 (IT) .................. 102023000013854

(51) Int. Cl.
*B60G 17/018* (2006.01)
*B60G 7/02* (2006.01)
(Continued)

(52) U.S. Cl.
CPC ............. *B60G 17/018* (2013.01); *B60G 7/02* (2013.01); *B60G 17/01908* (2013.01);
(Continued)

(58) Field of Classification Search
CPC ................... B60G 17/018; B60G 7/02; B60G 17/01908; B60G 2200/18; B60G 2202/42;
(Continued)

(56) References Cited

U.S. PATENT DOCUMENTS 10,471,788 B2   11/2019   Ohno et al.
2013/0197756 A1*  8/2013   Ramirez Ruiz ........ B62D 17/00
                                                      701/40
(Continued)

FOREIGN PATENT DOCUMENTS

DE    102010038238 A1 *  4/2012  ............. B60G 11/27
DE    102020111042 A1 * 10/2021
(Continued)

OTHER PUBLICATIONS

DE-102020111042-A1 Machine English Translation (Year: 2021).*
DE102010038238A1 Machine English Translation (Year: 2012).*
(Continued)

*Primary Examiner* — Jason D Shanske
*Assistant Examiner* — Matthew James O'Neill
(74) *Attorney, Agent, or Firm* — CANTOR COLBURN LLP (57) ABSTRACT

A suspension for a motor vehicle is described comprising a first lever directly or indirectly connected to a sprung mass and to an unsprung mass of said motor vehicle; and a shock absorber comprising a first element connected to the sprung mass and a second element connected to the unsprung mass movable relative to one another; the shock absorber comprises, in turn, a driving member, which can operatively be operated so as to determine the motion of the first element relative to the second element; and a transmission assembly designed to transmit the motion from said driving member to the first element; the suspension comprises a second lever defining a housing at least partly accommodating the transmission assembly; the second lever is articulated on said first lever and is directly or indirectly connected to the sprung mass and unsprung mass.

11 Claims, 10 Drawing Sheets

(51) Int. Cl.
*B60G 17/019* (2006.01)
*B60R 16/02* (2006.01)
*B60R 16/033* (2006.01)

(52) U.S. Cl.
CPC ........ *B60R 16/0207* (2013.01); *B60R 16/033* (2013.01); *B60G 2200/18* (2013.01); *B60G 2202/42* (2013.01); *B60G 2204/4106* (2013.01); *B60G 2204/419* (2013.01); *B60G 2206/124* (2013.01); *B60G 2400/10* (2013.01); *B60G 2500/30* (2013.01); *B60G 2600/14* (2013.01); *B60G 2800/01* (2013.01)

(58) Field of Classification Search
CPC ...... B60G 2204/4106; B60G 2204/419; B60G 2206/124; B60G 2400/10; B60G 2500/30; B60G 2600/14; B60G 2800/01; B60R 16/0207; B60R 16/033
See application file for complete search history.

(56) References Cited

U.S. PATENT DOCUMENTS

| | | | |
|---|---|---|---|
| 2018/0361816 A1* | 12/2018 | Ohno | B60G 17/0165 |
| 2020/0108681 A1* | 4/2020 | Matsumoto | B60G 7/008 |
| 2022/0250632 A1* | 8/2022 | Gattu | B60W 10/22 |
| 2022/0396110 A1* | 12/2022 | Oshida | F16H 25/20 |
| 2023/0302862 A1* | 9/2023 | Adamovsky | B60G 17/021 |

FOREIGN PATENT DOCUMENTS

| | | |
|---|---|---|
| GB | 2558771 A | 7/2018 |
| JP | 2002362123 A | 12/2002 |
| WO | 2022039752 A1 | 2/2022 |

OTHER PUBLICATIONS

Italian Search Report for Application No. 102023000013854; Filing Date: Jul. 4, 2023; Date of Completion: Dec. 15, 2023; 12 pages.

* cited by examiner

SUSPENSION FOR A MOTOR VEHICLE

CROSS-REFERENCE TO RELATED APPLICATIONS

This patent application is a continuation of U.S. patent application Ser. No. 18/386,788 filed on Nov. 3, 2023, which claimed priority from Italian patent application no. 102023000013854 filed on Jul. 4, 2023, the entire disclosures of which are incorporated herein by reference.

TECHNICAL FIELD

The present invention relates to a suspension for a motor vehicle.

In particular, the present invention is advantageously, but not exclusively, applied to a suspension for high-performance motor vehicles, to which the following description will explicitly refer without thereby losing generality.

BACKGROUND OF THE INVENTION

Different types of suspensions for road vehicles are known, which are generally identified as connecting elements between the sprung masses and the unsprung masses of a motor vehicle.

More specifically, the unsprung masses comprise the portions of the motor vehicle, such as for example the wheels, in direct contact with the ground, and the sprung masses comprise the portions of the motor vehicle, such as for example the body, not in direct contact with the ground.

In a known manner, motor vehicles comprise a pair of front suspensions designed to connect respective front wheels to the body and a pair of rear suspensions designed to connect respective rear wheels to the body.

In a known manner, each front or rear suspension comprises, in turn:
  a first element connected to a hub carrier of the relative wheel;
  a second element connected to the body;
  an elastic element interposed between the relative wheel and the body; and
  a shock absorber also interposed between the relative wheel and the body.

Each shock absorber comprises, in a known manner, a case connected to a relative wheel and the body, and a rod movable relative to the case and connected to the other one of the relative wheel and the body.

Each shock absorber further comprises a chamber interposed between the case and the rod filled with viscous fluid, so as to apply a damping force opposite the movement of the rod relative to the case.

The shock absorbers of passive type allow applying to the rod a damping force dependent only on the relative velocity between rod and case according to a predefined damping curve.

Semi-active shock absorbers are also known, which are capable of damping the motion of the rod by applying a force opposite the movement of the rod which can vary depending on the conformation of the ground and on the motion conditions of the motor vehicle.

Active shock absorbers are also known which are capable of generating autonomous forces and displacements, i.e. completely independent of the stresses transmitted by the road surface.

Such forces and displacements are added to the movements induced by the stresses transmitted by the road surface; the aim of the autonomous movements made by an active shock absorber is that of reacting to the stresses transmitted by the road surface so as to maximise the dynamic performance of the motor vehicle or improve the ride comfort of the motor vehicle also as a function of the type of driving chosen by the driver.

The active shock absorber is provided with a hydraulic or electric actuator of its own which can be driven so as to generate a force and a module and direction displacement which are autonomous, i.e. completely independent of the stresses transmitted by the road surface; for example, by driving the actuator of an active shock absorber, it is possible to lift and lower the chassis of the motor vehicle in an independent manner on each wheel also when the motor vehicle is still.

Recently, performance motor vehicles have been proposed manufactured according to an SUV-type configuration, i.e. having large mass and high centre of gravity, for which the use of active shock absorbers is desirable.

However, the known type of front and rear suspension configurations necessary for guaranteeing the desired dynamic attitude to the aforementioned motor vehicles with an SUV configuration do not allow accommodating the active shock absorbers.

The need is felt in the sector to obtain a front suspension and a rear suspension which allow accommodating the active shock absorber.

The object of the present invention is to manufacture a front suspension and a rear suspension capable of satisfying such need.

SUMMARY

The aforementioned object is achieved by a suspension for a motor vehicle according to claim 1.

BRIEF DESCRIPTION OF THE DRAWINGS

The present invention will now be described with reference to the accompanying drawings, which illustrate some non-limiting example embodiments thereof, wherein.

DETAILED DESCRIPTION

Figure 1:
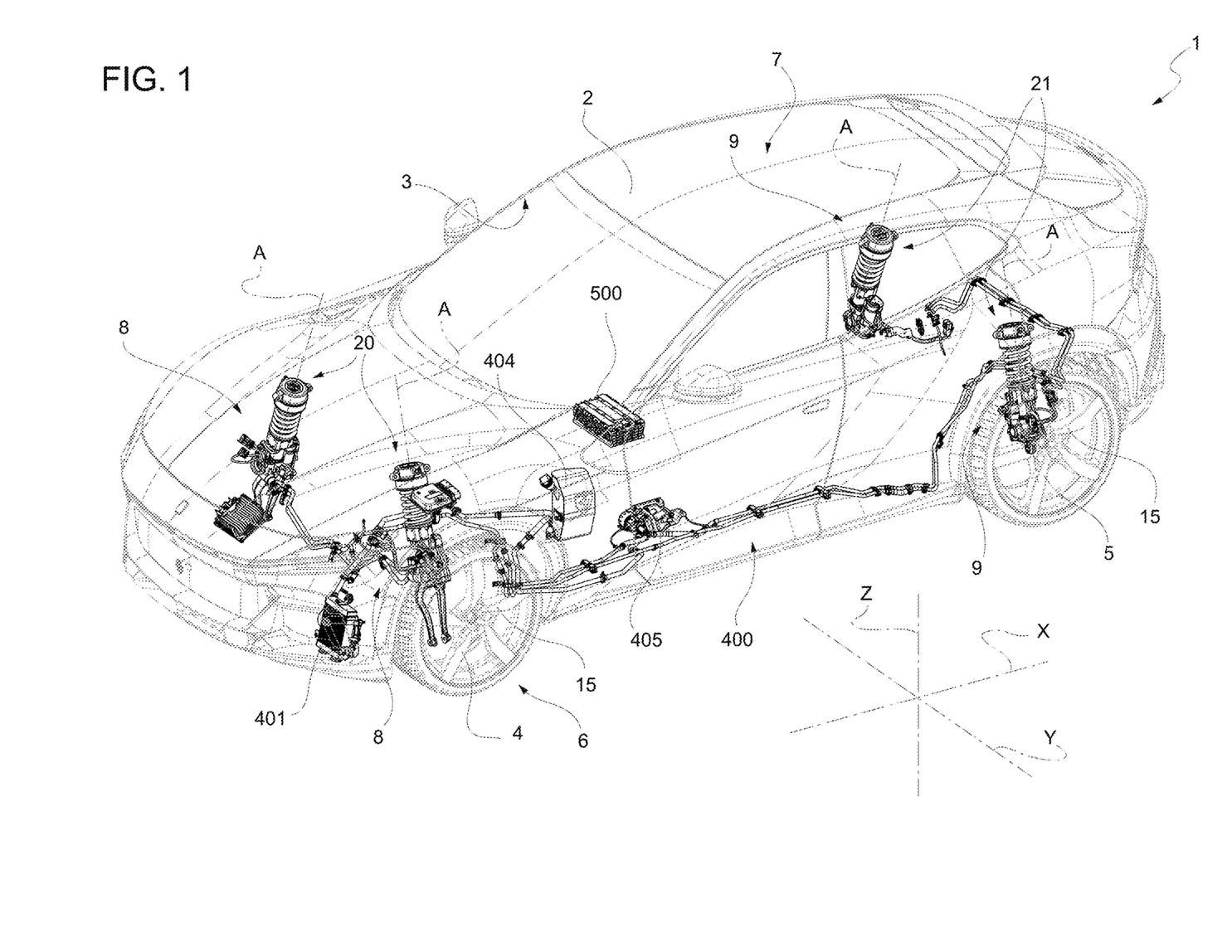
FIG. 1 is a perspective view of a motor vehicle comprising a pair of front suspensions and a pair of rear suspensions manufactured according to the teachings of the present invention, with parts removed for clarity.

With reference to FIG. 1, reference numeral 1 indicates a motor vehicle, preferably a performance-type motor vehicle manufactured according to an SUV configuration.

It is specified that in the following of the present description, expressions such as "at the top", "at the bottom", "at the front", "at the back", "left", "right" and the like are utilised with reference to a normal forward moving direction of the motor vehicle 1.

Furthermore, it is possible to define:
- a longitudinal axis X integral with the motor vehicle 1, arranged, in use, horizontally and parallel to a normal forward moving direction of the motor vehicle 1;
- a transversal axis Y integral with the motor vehicle 1, arranged, in use, horizontally and orthogonal to the axis X; and
- an axis Z integral with the motor vehicle 1 arranged, in use, vertically and orthogonal to the axes X, Y.

With reference to FIG. 1, the motor vehicle 1 essentially comprises:
- a body 2 defining a passenger compartment 3;
- a pair of front wheels 4 provided with respective front axle shafts 10; and
- a pair of rear wheels 5 provided with respective rear axle shafts 11.

Each wheel 4, 5 comprises, in turn (Figures from 2 to 5):
- a relative hub 15 and provided with a brake disc 17; and
- a relative hub carrier 16 angularly integral with the corresponding hub 15.

The motor vehicle 1 comprises, for each wheel 4, 5, a brake calliper 18 and a pad which can be operated for abutting against the corresponding disc 17 and exerting a braking torque on the disc 17.

The motor vehicle 1 further comprises, in a known manner:
- an unsprung mass 6 comprising the wheels 4, 5;
- a sprung mass 7 comprising the body 2;
- a pair of front suspensions 8 (Figures from 2 to 5) designed to elastically connect respective wheels 4 to the body 2; and
- a pair of rear suspensions 9 (Figures from 6 to 9) designed to elastically connect respective wheels 5 to the body 2.

Each suspension 8, 9 comprises, in turn, an active shock absorber 20, 21 and a hydraulic actuator 40.

With reference to Figures from 2 to 9, the active shock absorber 20, 21 is configured to:
- determine a first force on the body 2 with a target module and direction, depending on the instantaneous operating conditions of the motor vehicle 1; and
- determine a second additional force of viscous type on the body 2.

The actuator 40 can be operated for adjusting the height of the body 2 from the ground along the axis Z, depending on the preferences of the driver and in a manner independent of the operating conditions of the motor vehicle 1.

In the following, a single shock absorber 20 and a single actuator 40 are described, being the shock absorbers 20 identical to one another.

With reference to Figures from 2 to 5, the shock absorber 20 comprises, in brief:
- a case 19;
- a motor 22, an electric motor in the illustrated case, comprising a stator 23 fixed to the case 19 and an outlet member 24 revolving with respect to the stator 23; and
- a rod 25 movable along an axis A of its own relative to the case 19 under the action of the motor 22, so as to exert the first force with target module and direction on the body 2.

The shock absorber 20 further comprises (FIG. 5):
- a transmission assembly 26 operatively interposed between the outlet member 24 and the rod 25 for transforming the rotation of the outlet member 24 into the translation of the rod 25 along the axis A; and
- a hydraulic valve assembly 27, for example of the passive type (only schematically illustrated), which can be operated for determining a target flow rate of a viscous fluid inside a pair of chambers 32a, 32b delimited between rod 25, a piston 250 and case 19.

Figure 5:
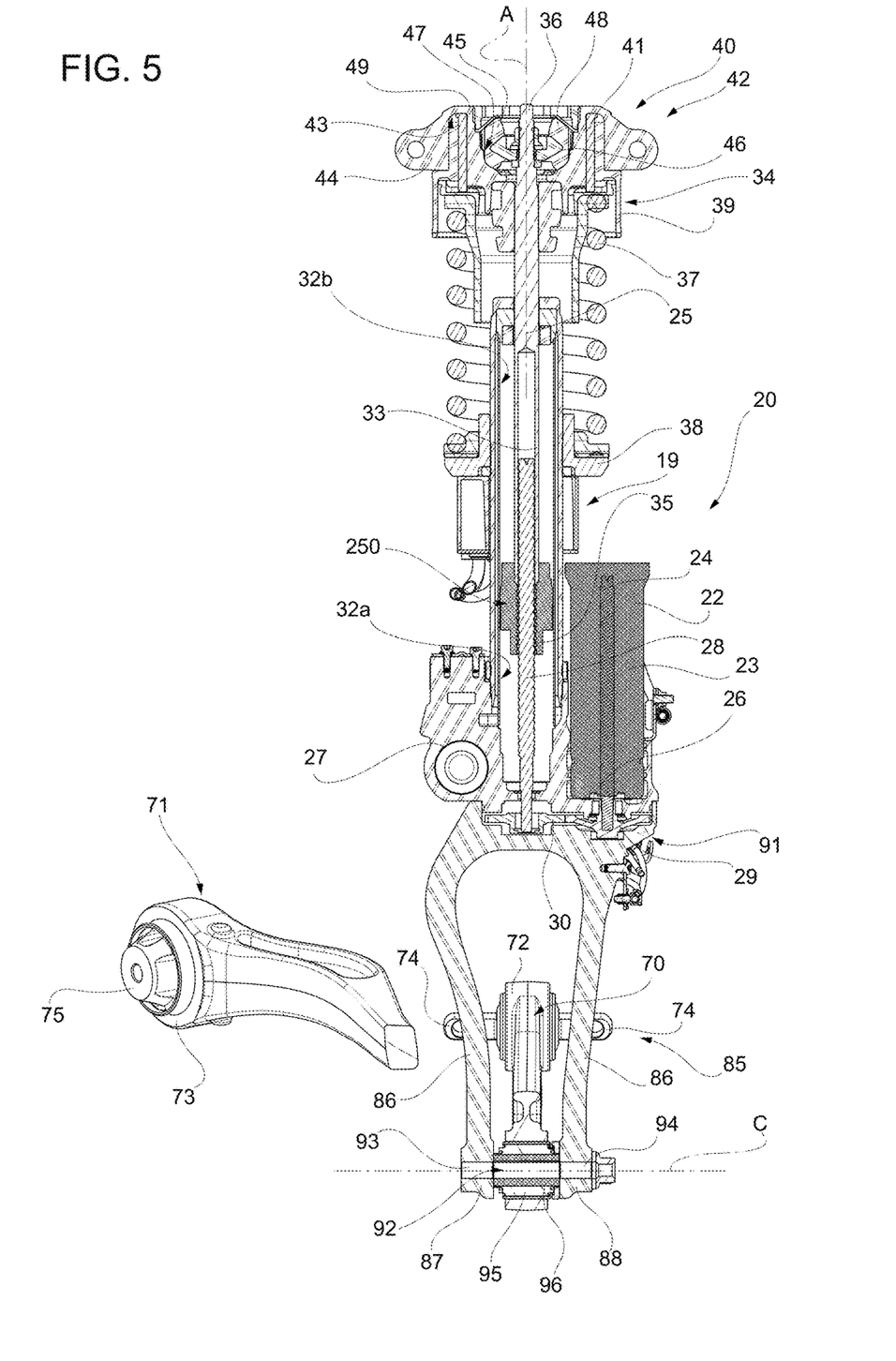
FIG. 5 is a partly exploded section along line V-V of FIG. 4.
Figure 6:
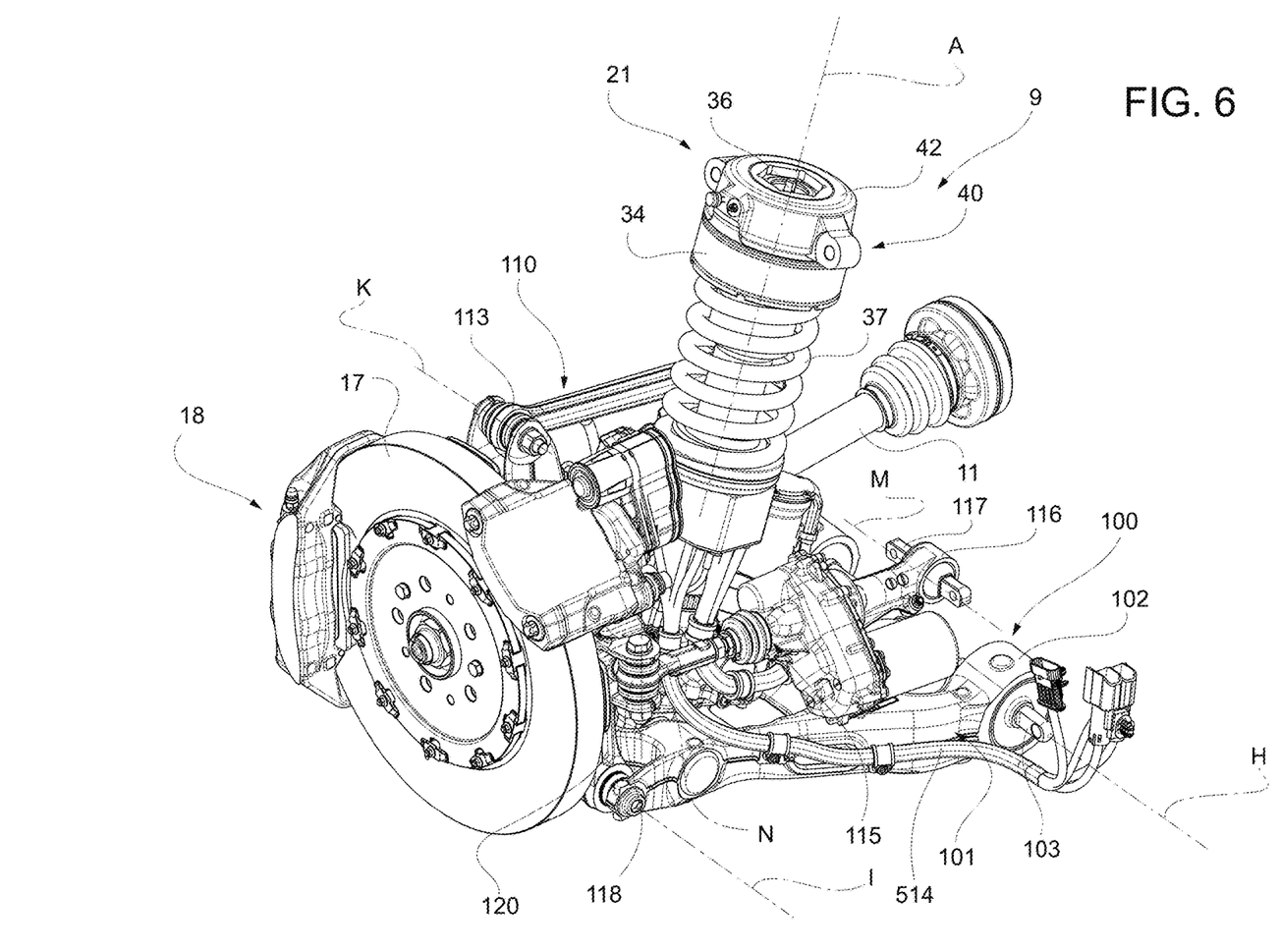
FIGS. 6 and 7 are perspective views on an enlarged scale and according to visual angles different from one another of the rear suspension of FIG. 1.

In particular, the rod 25 comprises a pair of ends 35, 36 axially opposite one another and being a bottom end and a top end, respectively.

The end 35 is accommodated inside the chamber 32a and the end 36 is connected to the body 2 by means of the actuator 40.

The rod 25 further comprises a main portion 33 interposed along the axis A between the ends 35, 36 and accommodated in a sliding manner inside the chamber 32b.

The transmission assembly 26 comprises, in turn:
- a recirculating-ball screw 28 fixed to the end 35 of the rod 25;
- a gear wheel 29 dragged into rotation by the outlet member 24; and
- a gear wheel 30 meshing with the screw 28 and with the gear wheel 29.

With particular reference to FIG. 5, the shock absorber 20 further comprises a spring 37, a helical spring in the illustrated case, interposed coaxial to the rod 25 between the case 19 and the actuator 40. In particular, the spring 37 is interposed along the axis A between a plate 38 carried by the case 19 and a plate 39.

The plate 39 defines a support having an annular shape radially projecting outwards from a free end of a tubular spacer 34 mounted coaxial to the axis A and provided with dust cover for protecting the rod 25.

The actuator 40 is mounted at an end of the shock absorber 20 opposite along the axis A relative to the gear wheels 29, 30.

In the illustrated case, the actuator 40 is an actuating cylinder of hydraulic type.

The actuator 40 comprises an inner piston 41 having a cylindrical shape, which is mounted coaxial to the axis A, axially projects from the free end of the spacer 34, extends on the side opposite the spring 37 relative to the plate 39, and is coupled in an axially fixed manner to the spacer 34.

The actuator 40 further comprises an outer cylinder 42 having an annular shape, which is coaxial to the axis A, has a substantially U-shaped cross-section with concavity facing the spring 37, and is engaged in a sliding manner on the piston 41.

The piston 41 and the cylinder 42 are coupled to one another in a fluid-tight manner for defining a feeding chamber 43 connected to an oil feeding device under known pressure and not illustrated.

The cylinder 42 carries integrated a top attachment 44 obtained on the outer surface of the cylinder 42 for hooking the shock absorber 20 to the body 2.

The cylinder 42 further has a central seat 47 obtained on the inner surface coaxial to the axis A for receiving and holding a damping block 45, which has a tubular shape, is axially locked in the seat 47 by means of a locking ring nut 49 screwed in the cylinder 42, and allows damping the relatively high frequency vibrations exerted on the chassis (not illustrated) of the vehicle (not illustrated).

The block 45 comprises a central body 46 made of a metallic material coupled in an axially fixed manner to the rod 25, and a damping element 48 made of an elastically deformable material mounted around the body 46.

The operation of the actuator 40 imparts to the assembly defined by the rod 25, by the cylinder 42, and by the damping block 45 and thus to the body 2 straight displacements parallel to the axis A between a lifted position (not illustrated in FIG. 5), necessary for allowing the motor vehicle 1 to overcome obstacles of relatively reduced height, and a lowered position (illustrated in FIG. 5), necessary for allowing the correct ride of the motor vehicle 1.

In the following, one single front suspension 8 is described, being both suspensions 8 identical to one another.

With reference to Figures from 2 to 5, the suspension 8 is, in the illustrated case, of the articulated quadrilateral type.

Figure 2:
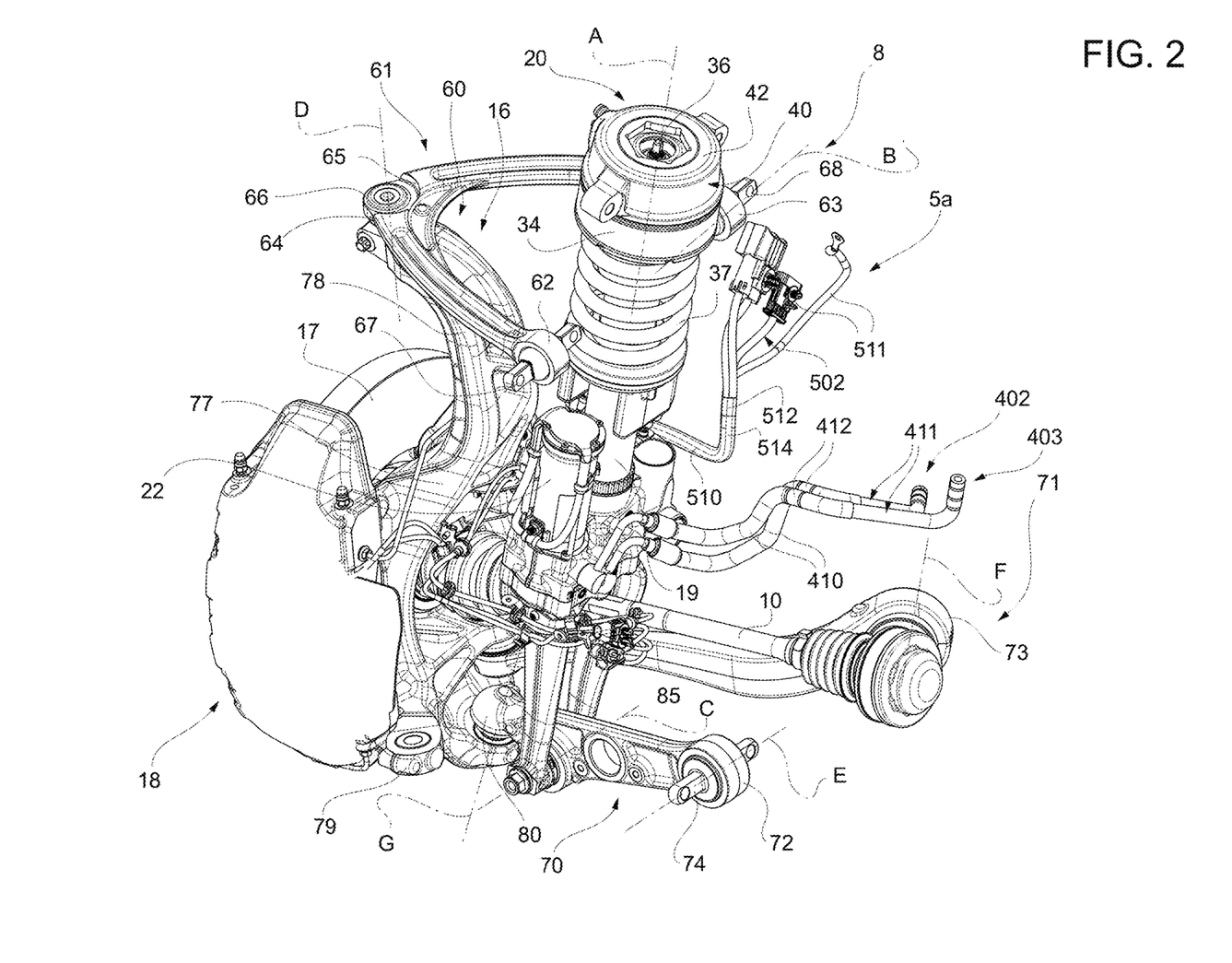
FIGS. 2 and 3 are perspective views on a particularly enlarged scale of the front suspension of FIG. 1.
Figure 3:
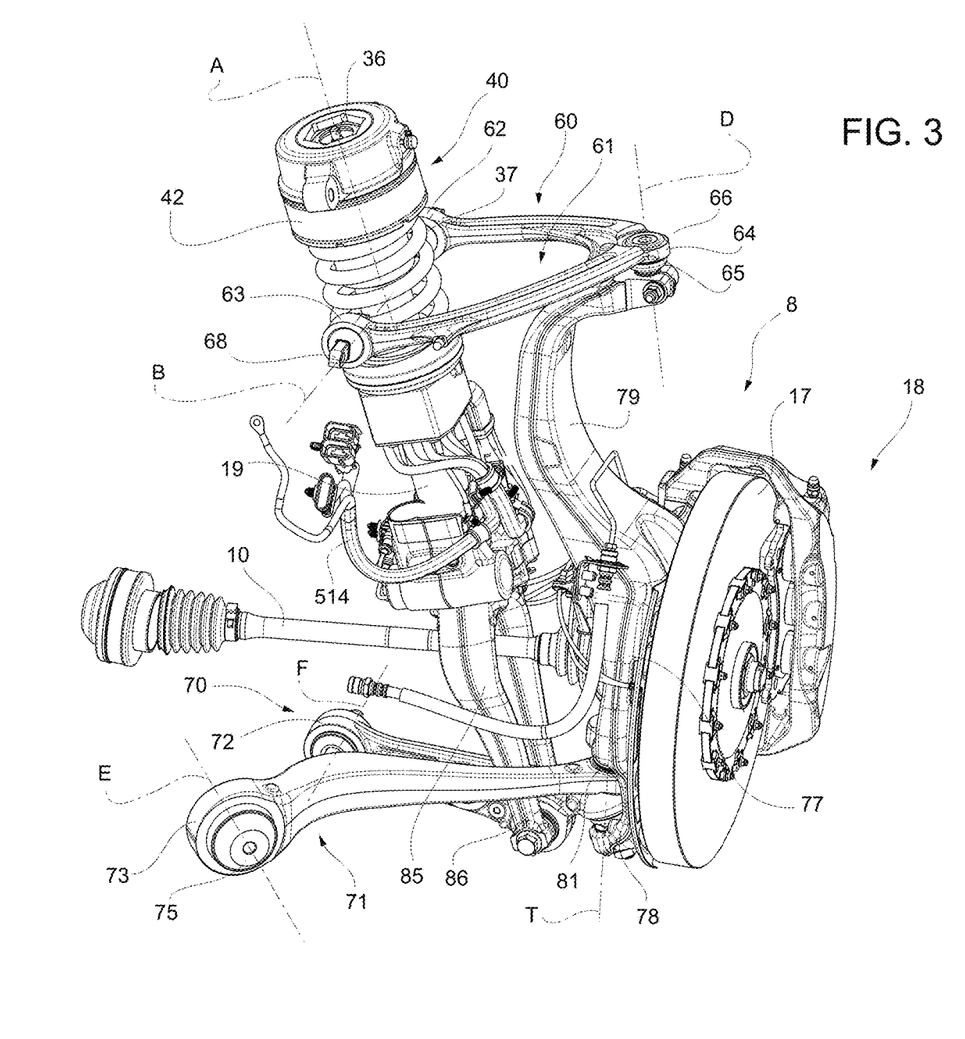

The suspension 8 comprises, more specifically:
 a top lever formed by a pair of arms 60, 61 having respective ends 62, 63 coupled to respective attachment elements 67, 68 of the body 2 in a rotary manner around a substantially horizontal common axis B, and respective ends 64, 65 opposite corresponding ends 62, 63 and fixed to an apex 66 of the hub carrier 16 in a rotary manner around a common axis D orthogonal to the axis B and substantially vertical; and
 a pair of bottom arms 70, 71 having respective ends 72, 73 fixed to respective attachment elements 74, 75 of the body 2 around respective axes E, F and respective ends 80, 81 opposite corresponding ends 72, 73 and fixed to the hub carrier 16 in a rotary manner around respective substantially vertical axes G, T (visible in FIGS. 2 and 3, respectively).

The hub carrier 16 comprises, in turn:
 a main body 77 crossed by the relative axle shaft 10 and fixed to the hub 15;
 an arm 79 projecting cantilevered at the top from the main body 77 and having the apex 66 in a position opposite the main body 77; and
 a plate 78 projecting at the bottom from the main body 77, bent on the side opposite the relative wheel 4 and hinged to the ends 80, 81 of the arms 70, 71 around the respective axes G, T.

The arms 60, 61 are crossed by the spring 37 of the shock absorber 10.

Advantageously, the suspension 8 further comprises (FIG. 4) a lever 85 defining a housing 91 at least partly accommodating the transmission assembly 26, articulated on the arm 70 and at least indirectly connected to the body 2 and to the wheel 4.

Figure 4:
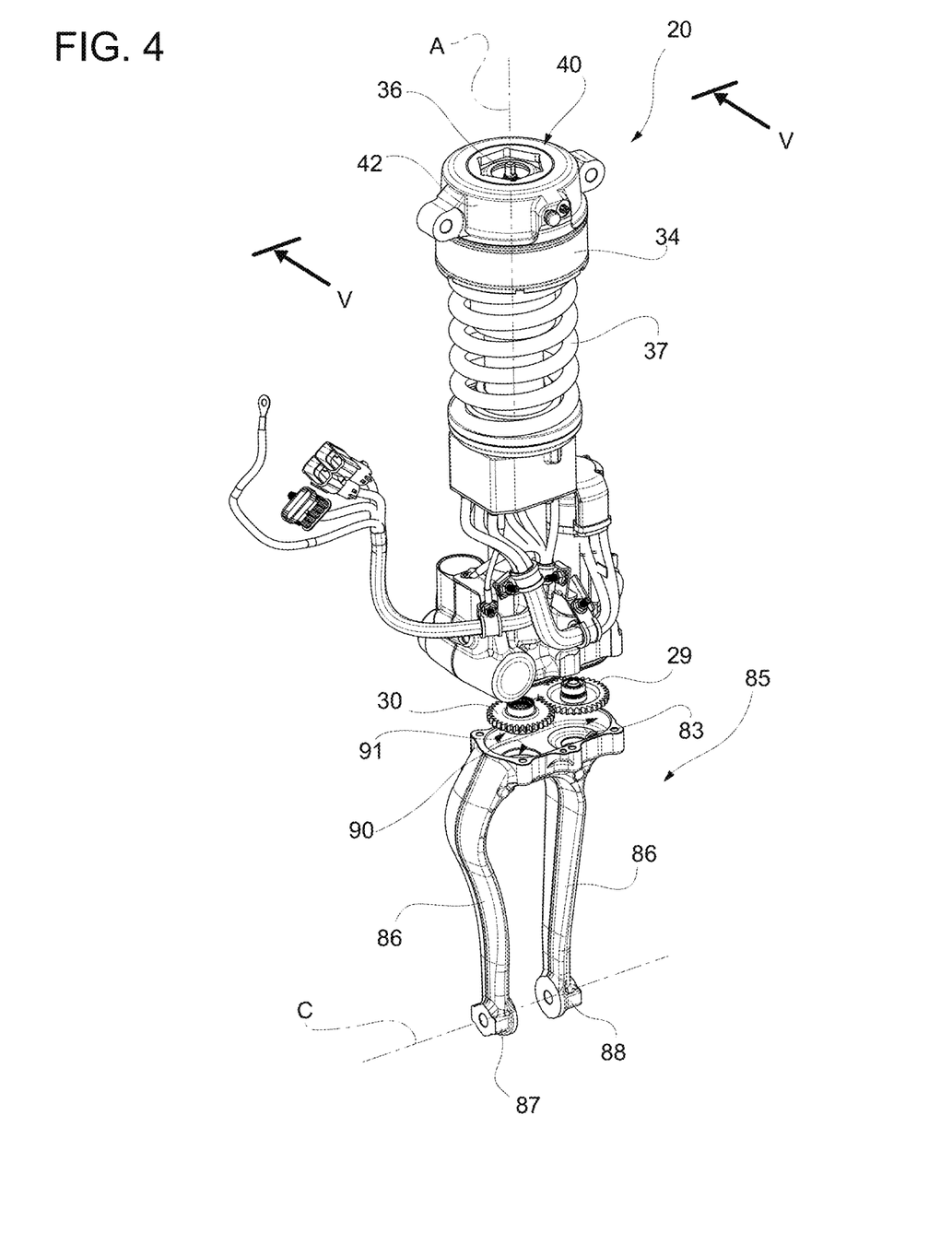
FIG. 4 is a partly exploded perspective view on a still further enlarged scale of a shock absorber of the front suspension of FIGS. 2 and 3, with parts removed for clarity.

In particular, the housing 91 is open towards the top of the case 19 and collaborates with the case 19 for defining a casing partly accommodating the transmission assembly 26.

The lever 85 is fixed to the case 19 of the shock absorber 20 so as to define the aforementioned casing and hinged to the arm 70 around an axis C.

The lever 85 is conformed as a fork and comprises, in turn:
 a pair of arms 86 hinged to the arm 70 around the axis C at respective end seats 87, 88; and
 the housing 91 arranged on the side opposite the ends 87, 88, fixed to the case 19 on the side opposite the rod 25, extending crosswise to the arms 86 and accommodating the gear wheels 29, 30.

More specifically, the housing 91 defines a pair of seats 89, 90 for the respective gear wheels 29, 30. The seats 89, 90 are open at the top towards the case 19.

The arms 86 are spaced apart from one another parallel to the axis C, and extend at a distance at first increasing and subsequently decreasing and then constant, proceeding from the housing 91 towards the ends 87, 88.

The lever 85 further comprises (FIG. 5):
 a bushing 92 extending parallel to the axis F and having respective ends 93, 94 accommodated in a rotationally fixed manner relative to the axis C inside the respective seats 87, 88;
 a joint 95 defined by an end of the arm 70 and surrounding the bushing 92;
 a tubular element 96, made of an elastomer material, and radially interposed between the joint 95 and the bushing 92.

In the illustrated case, the axes B, C are parallel to one another.

With reference to Figures from 6 to 9, in the following one single rear suspension 9 is described, being both rear suspensions 9 identical and symmetrical to one another.

The suspension 9 is, in the illustrated case, of the multi-link type.

The suspension 9 comprises, more specifically (FIGS. 8 and 9):
 a substantially trapezoidal plate 100 hinged to the body 2 around an axis H;
 a connecting rod 120 hinged to the plate 100 around an axis I and to the hub carrier 16 around an axis P, and spaced apart from one another parallel to the axis I;
 a lever 110 having an end 111 coupled to an attachment element 112 of the body 2 in a rotary manner around an axis J and an end 113 coupled to the hub carrier 16 in a rotary manner around an axis K; and
 a lever 115 (FIG. 7) having an end 116 coupled to an attachment element 117 of the body 2 in a rotary manner around an axis M and an end 118 coupled to the hub carrier 16 in a rotary manner around an axis N.

Figure 7:
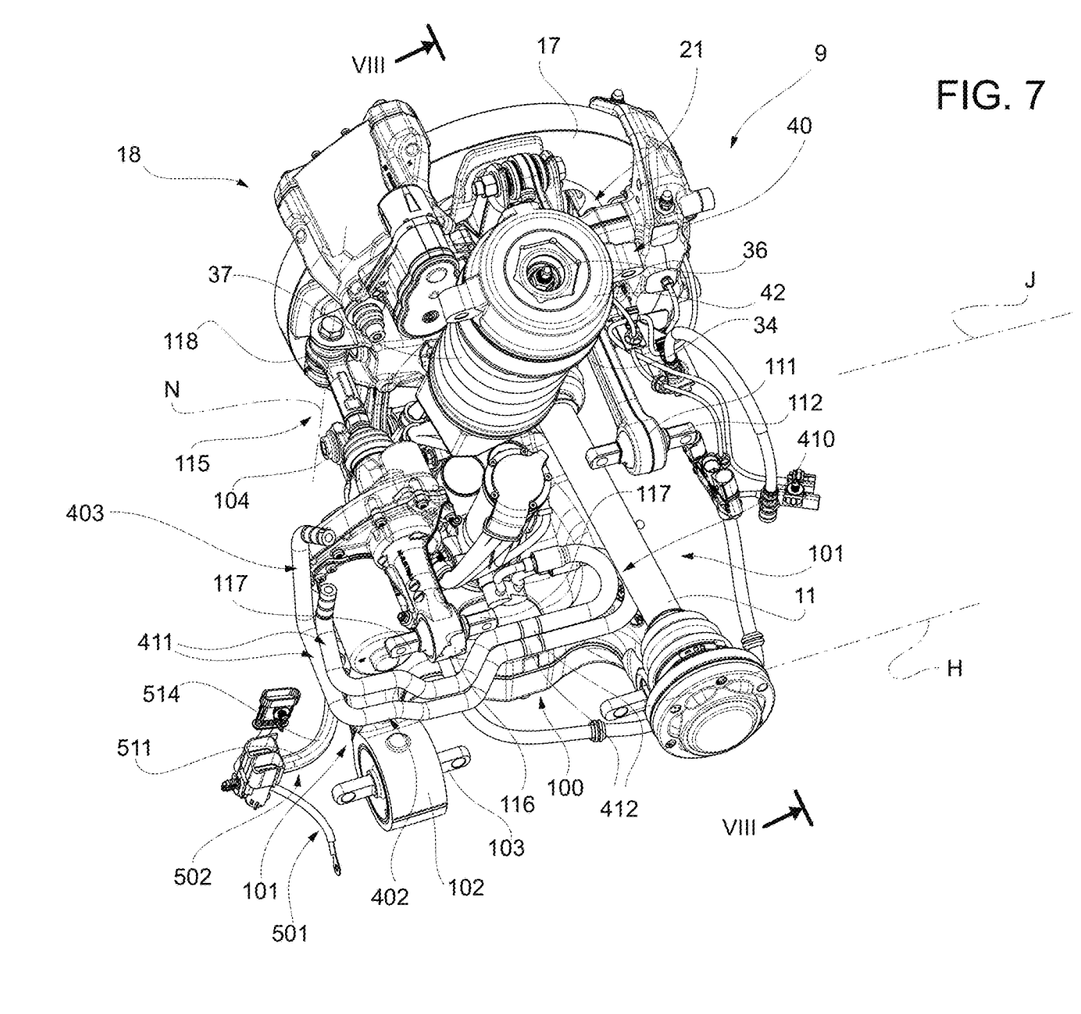

The lever 115 is, in a known manner, actuated and has a variable length, in particular telescopic, so as to form, together with the lever 115 of the further suspension 9, a steering mechanism of the rear wheels 5.

In particular, the shortening or the extension of the lever 115 determines a variation of the steering angle of the wheel 5, i.e. of the angle defined between a plane integral with the wheel 5 and the axis Z.

Figure 8:
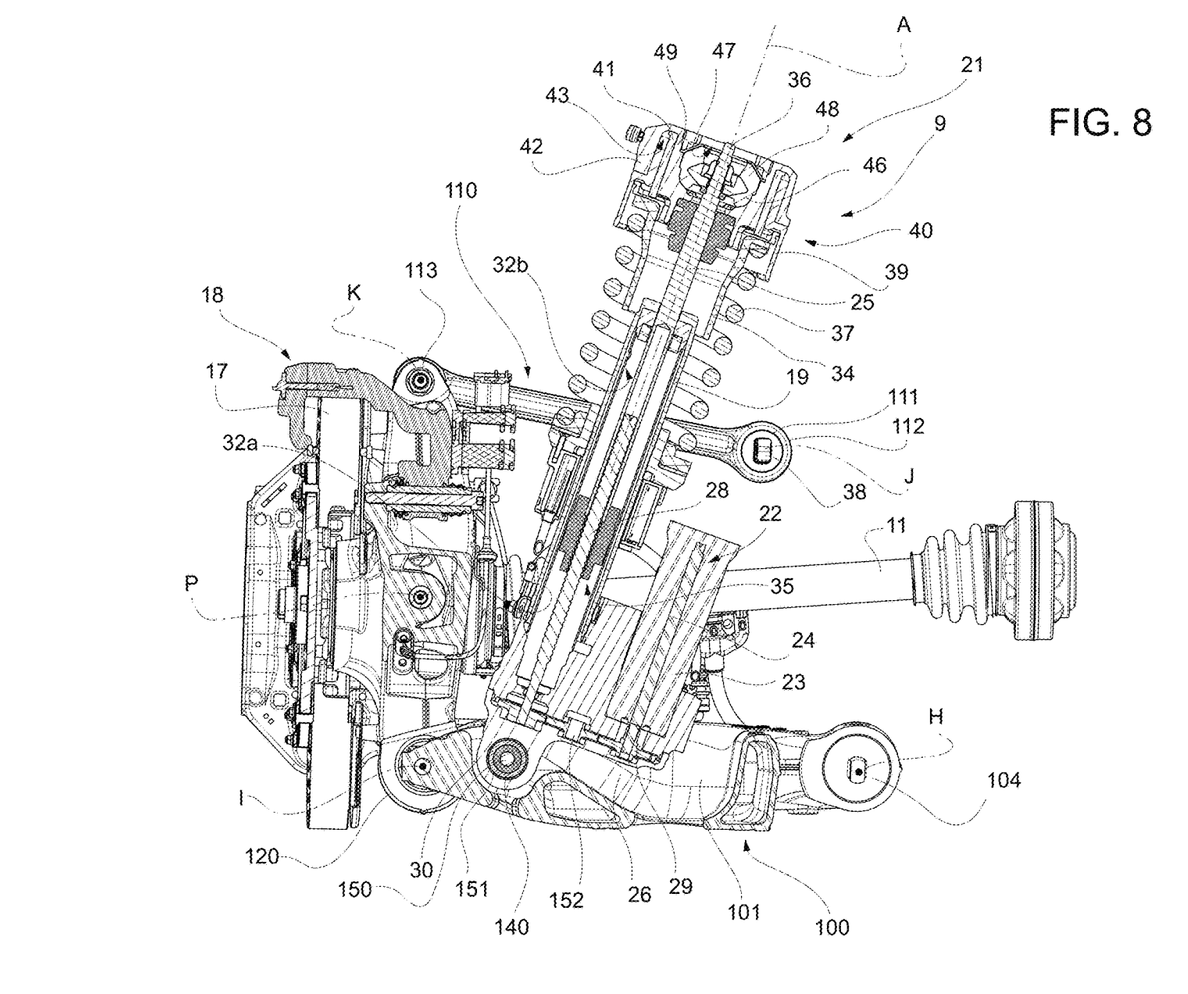
FIG. 8 is a section along line VIII-VIII of FIG. 7.
Figure 9:
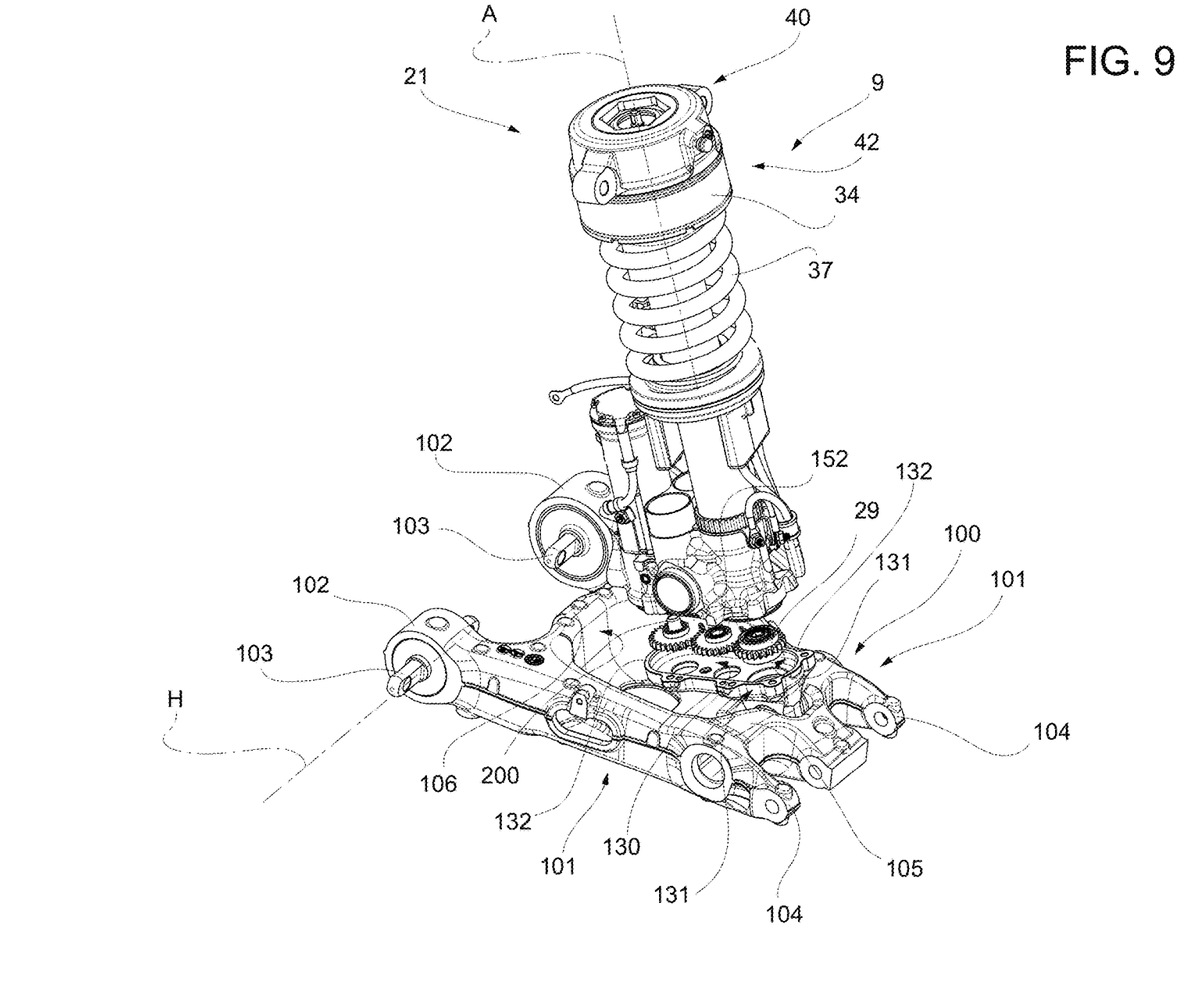
FIG. 9 is an exploded view of some components of the rear suspension of Figures from 6 to 8.

More specifically, the plate 100 comprises a pair of arms 101 opposite one another and each provided with an end 102 coupled to a respective attachment element 103 of the body 2 in a rotary manner around the axis H and an end 104 opposite the end 102 coupled to the relative connecting rod 120 in a rotary manner around the axis I.

The plate 100 further comprises a pair of arms 105, 106 extending between the arms 101.

The arm 106 is interposed between the arm 105 and the ends 103 of the arms 101.

In particular, the arms 101 converge with respect to one another, proceeding from the ends 103 towards the corresponding ends 104.

The axes H, I, J, and K are, in the illustrated case, parallel to one another and arranged substantially horizontal.

The axes M, N are, in the illustrated case, vertical and orthogonal to the axes H, I, J and K.

The suspension 9 comprises a shock absorber 21 completely similar to the shock absorber 20 and described only for what differs from the shock absorber 20.

More specifically, the shock absorber 21 differs from the shock absorber 20 due to the fact that the housing 91 further accommodates a gear wheel 152 meshing with the gear wheels 29, 30, so as to guarantee the target transmission ratio as a function of the available installation space.

The housing 91 is delimited at the bottom by the plate 100 and at the top by the case 19 of the shock absorber 21.

The shock absorber 21 further comprises a lever 140 connected to the case 19 and defining the housing 91 accommodating the gear wheels 29, 30, 152.

Advantageously, the plate 100 is boxed and defines a housing seat 130 for the lever 140; the plate 100 and the lever 140 are hinged to one another around an axis L.

More specifically, the plate 100 comprises a wall 200 having a shape joined and conformed to the arms 101, 105, 106 and defining the seat 130.

The seat 130 is open on the side of the shock absorber 21 and closed on the side opposite the shock absorber 21, with the exception of a bottom opening having the function of lightening and of draining water and crushed stone which otherwise would accumulate in the lever.

The seat 130 is delimited by:
- a pair of straight edges 131 opposite one another and interposed between the arms 101 parallel to the axes H, I, J, K; and
- a pair of curved edges 132 opposite one another, which join the edges 131 and are interposed between the edges 105, 106 orthogonal to the axes H, I, J, K and L.

The lever 140 is hinged, in particular, to the arm 105.

The axis L is, in the illustrated case, parallel to the axes H, I, J and K.

The axis L is further interposed between the axes I, H.

Similar to the lever 85, the lever 140 comprises:
- a bushing 150 extending parallel to the axis L and having respective ends opposite one another accommodated in a rotationally fixed manner relative to the axis L inside respective seats defined by the plate 100;
- a joint 151 rotating around the axis L; and
- a tubular element 154 of axis L, made of an elastomer material, and radially interposed between the joint 151 and the bushing 150.

The motor vehicle 1 further comprises (FIG. 10):
- a control unit 300;
- a plurality, three in the illustrated case, of accelerometers 313, 314, 315 (these also only schematically illustrated in FIG. 1) configured to measure the respective accelerations $a_y$, $a_y$, $a_z$ of the motor vehicle 1 along the respective axes X, Y, Z;
- a plurality, four in the illustrated case, of accelerometers 320, 321, 322, (these also only 323 schematically illustrated in FIG. 1) configured to measure the respective accelerations $a_4$, $a_{4'}$, $a_5$, $a_{5'}$ of the respective front and rear wheels 4, 5;
- a plurality, four in the illustrated case, of sensors 330, 331, 332, 333 (these also only schematically illustrated in FIG. 1) configured to measure the positions $s_4$, $s_{4'}$, $s_5$, $s_{5'}$ of the respective front and rear wheels 4, 5; and
- a sensor 340, having six degrees of freedom in the illustrated case, configured to measure the time variation γ' of the yaw angle of the motor vehicle 1 around the axis Z.

Figure 10:
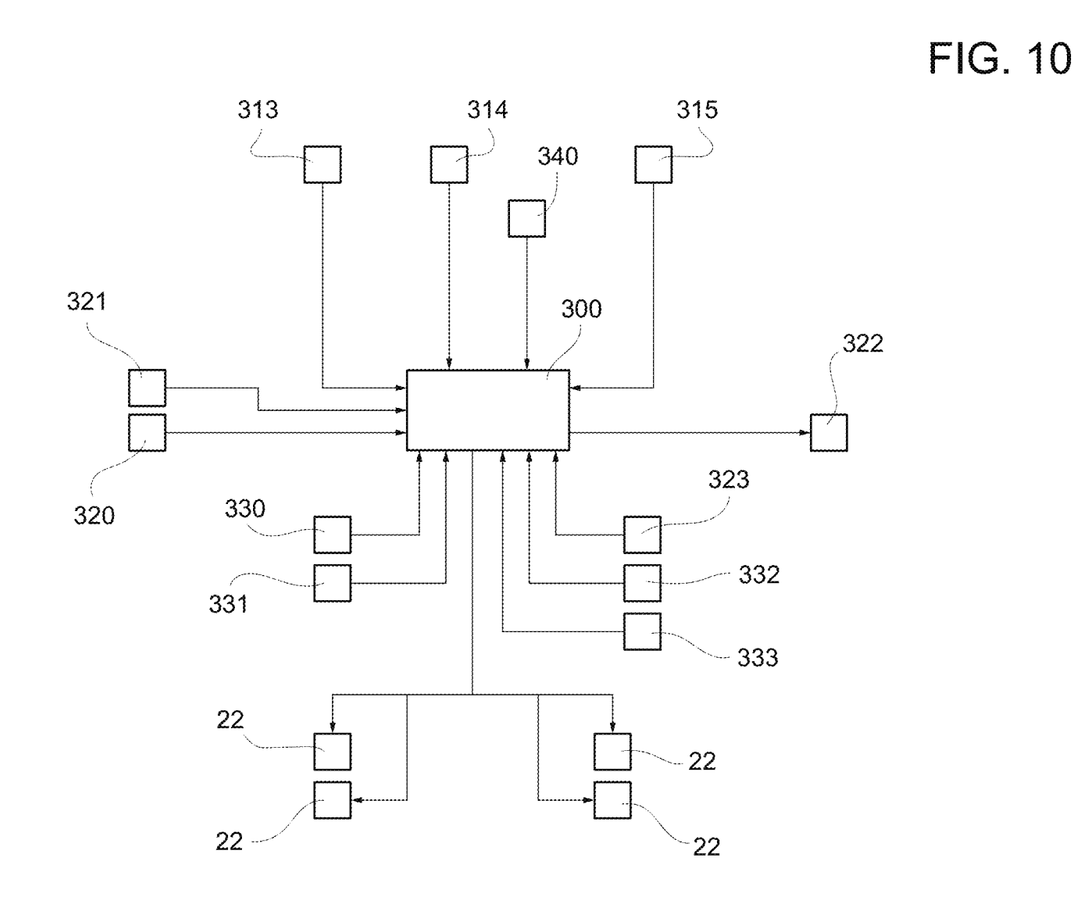
FIG. 10 schematically illustrates further components of the motor vehicle of FIG. 1.

The control unit 300 is operatively connected to the accelerometers 313, 314, 315; the accelerometers 320, 321, 322, 323; and the sensors 330, 331, 332, 333 and 340 for controlling the electric motors 22, based on the respective accelerations $a_y$, $a_y$, $a_z$; $a_4$, $a_{4'}$, $a_5$, $a_{5'}$; displacements $s_4$, $s_{4'}$, $s_5$, $s_{5'}$; and time variations γ', so as to produce a target driving attitude of the motor vehicle 1.

The motor vehicle 1 further comprises a cooling circuit 400 designed to cool the electric motors 22.

More specifically, the cooling circuit 400 comprises (FIG. 1):
- a tank 404 filled with a heat transfer fluid;
- a heat exchanger 401 carried by the body 2 and designed to cool the heat transfer fluid coming from the electric motors 22;
- a plurality of ducts 402 (FIGS. 2 and 8) interposed between the heat exchanger 401 and the respective electric motors 22 and designed to cause the heat transfer fluid to flow from the heat exchanger 401 to the respective electric motors 22 at a first temperature;
- a plurality of ducts 403 interposed between the respective electric motors 22 and the heat exchanger 401 and designed to cause the heat transfer fluid, which has cooled the electric motors 22 and which is thus at a second temperature higher than the first temperature, to flow from the electric motors 22 to the heat exchanger 401; and
- a pump 405 which allows the flow of the heat transfer fluid along the ducts 402, 403.

Each duct 402, 403 comprises, in turn:
- a respective segment 410 accommodated on the relative wheel 4, 5 and arranged at the electric motors 22 of the shock absorbers 20, 21; and
- a respective segment 411 fixed to the body 2 by means of a clamp 412.

The segments 410 are U-bent.

The motor vehicle 1 finally comprises:
- a power source 500, for example, a battery carried by the body 2; and
- a plurality of electric cables 501, 502 (FIGS. 2 and 7) interposed between the source 500 and the respective electric motors 22, and designed to electrically power the electric motors 22.

Each electric cable 501, 502 comprises, in turn:
- a respective segment 510 accommodated on the relative wheel 4, 5 and arranged at the electric motors 22 of the shock absorbers 20, 21; and
- a respective segment 511 fixed to the body 2 by means of a clamp (not illustrated) applied on the segment 512.
- a segment 514 designed to compensate the relative rebounds between the suspension and the body, with the function to connect the segments 510 and 511.

The segments 510 are provided with a jacket.

The electric cables 500, 501 are partly arranged on the relative electric motors 22 and partly extend between the sprung mass 7 and the unsprung mass 6.

In use, the control unit 300 controls the electric motors 22, based on the respective accelerations $a_y$, $a_y$, $a_z$; $a_4$, $a_{4'}$, $a_5$, $a_{5'}$, detected by the accelerometers 313, 314, 315; 320, 321, 322; 323, of the displacements $s_4$, $s_{4'}$, $s_5$, $s_{5'}$; and of the time variations γ' detected by the sensors 330, 331, 332, 333 and 340, so as to produce a target driving attitude of the motor vehicle 1.

More specifically, following the operation of the electric motors 22, the rods 25 make first displacements and apply respective first forces on the body 2 parallel to the axis A, so as to produce the target driving attitude of the motor vehicle 1.

The shock absorbers 20, 21 of the suspensions 8, 9 further generate respective second return viscous forces, i.e. proportional to the velocity difference between the respective rods 25 and the corresponding casings 19, on the body 2.

Simultaneously, the springs 37 of the suspensions 8, 9 generate respective return elastic forces, i.e. proportional to the relative displacement between the relative plates 38, 39, on the body 2.

The resultant of the aforementioned first forces, second return viscous forces and return elastic forces determines the motion of the sprung mass 7 relative to the sprung mass 6.

During the operation of the shock absorbers 20, 21, the cooling circuit 400 cools the electric motors 22 by means of the respective ducts 402, 403 and the source 500 electrically powers the electric motors 22 by means of the respective cables 501, 502.

If wanting to vary the height of the body 2 relative to the ground depending on the preferences of the driver and in a manner independent of the operating conditions of the motor vehicle 1, it is sufficient to operate the actuator 40.

Based on an examination of the suspensions 8, 9 manufactured according to the present invention, the advantages that it allows obtaining are evident.

In particular, the lever 85 and the lever 140 of the suspensions 8, 9 define the housing 91 which accommodates the gear wheels 29, 30; 29, 30, 152 of the transmission assembly 26.

It is thus possible to accommodate the shock absorbers 20, 21 inside the suspensions 8, 9 of the articulated quadrilateral and multilink type.

Thanks to this, it is possible to advantageously use the shock absorbers 20, 21 of "active" type, i.e. capable of generating a target force value on the body 2 also in performance motor vehicles 1 with particularly high centre of gravity and large mass.

The lever 85 and the lever 140 are respectively articulated on the arm 70 and the lever 90, in turn articulated on the respective hub carriers 16 and body 2, and interact with the body 2 by means of the respective shock absorbers 20, 21. Consequently, the lever 85 and the lever 140 carry out a relevant and active role in defining the allowed displacements between the body 2 and each wheel 4, 5 from the corresponding suspensions 8, 9.

The segments 410 fixed to the unsprung mass 6 of the respective ducts 402, 403 are U-shaped. In such manner, the segments 410 can be easily arranged in the limited space of the relative wheels 4 and 5, and support the torsional loads due to the relative rebound movement between the wheels 4, 5 and the body 2 carrying the segments 411.

The segments 510 fixed to the unsprung mass 6 of the respective electric cables 502, 503 and the connecting segments 514 are provided with a jacket 513. In such manner, the segments 510 and 514 can be easily arranged in the limited space of the relative wheels 4 and 5 and exposed to external atmospheric agents such as for example water infiltration and humidity, and to be simultaneously protected by the unavoidable relative slipping due to the rebound movement of the body 2 carrying the segments 411 relative to the wheels 4, 5.

Finally, it is clear that modifications and variations can be made to the suspensions 8, 9 manufactured according to the present invention, which however do not depart from the scope of protection defined by the claims.

In particular, the gear wheels 29, 30 could be replaced by a pulley or by a different type of transmission.

The invention claimed is:

1. A suspension (8; 9) for a motor vehicle (1) comprising:
at least one first lever (70; 100) directly or indirectly connected to a sprung mass (7) and to an unsprung mass (6) of said motor vehicle (1); and
a shock absorber (20; 21) comprising a first element (25) connected to said sprung mass (7) and a second element (19) connected to said unsprung mass (6); said first element (25) being movable relative to said second element (19);
wherein said shock absorber (20, 21) comprises, in turn:
a driving member (22) comprising a rotatable outlet member (24), which can operatively be operated so as to determine the motion of one (25) of said first element and second element (25, 19) relative to the other one (19) of said first element and second element (25, 19);
a transmission assembly (26) designed to transmit a rotary motion from the rotatable outlet member (24) of said driving member (22) to said one (25) of said first element and second element (25, 19), wherein the second element (19) and the rotatable outlet member (24) are not coaxial to one another, and wherein the motion of said first element and second element (25, 19) relative to one another translates in a sliding manner along an axis (A); and
a second lever (85; 140) defining a housing (91) at least partly accommodating said transmission assembly (26); said second lever (85; 140) being articulated on said first lever (70; 100) and being directly or indirectly connected to said sprung mass (7) and unsprung mass (6), wherein said housing (91) is open at one end to define seats (89, 90) for at least two rotatable gear wheels (29, 30) and is fixed to the other one (19) of said first and second element (25, 19) so as to define a closed casing accommodating, on an inside, the at least two rotatable gear wheels (29, 30) of said transmission assembly (26).

2. "The suspension according to claim 1, wherein said transmission assembly (26) comprises, in turn, the at least two gear wheels (29, 30; 29, 30, 152) meshing with one another and accommodated inside said housing (91);
said gear wheels (29, 30; 29, 30, 152) receiving, in use, the motion from said driving member (22) and transmitting, in use, the motion to said second element (25).

3. The suspension according to claim 1, wherein said second lever (85) comprises a fork articulated on said first lever (70) and defining said housing (91);
said fork comprising, in turn, a pair of arms (86) spaced apart from one another and having first ends (87, 88) artiulated on said first lever (70) around a first axis (C);
said housing (91) extending crosswise to said arms (86) and being arranged on a side opposite said first ends (87, 88).

4. The suspension according to claim 1, wherein the suspension is an articulated quadrilateral type comprising:
a third lever (71) directly or indirectly connected to the sprung mass (7) and to the unsprung mass of said motor vehicle (1); and
a pair of fourth levers (60, 61) having respective third ends (62, 63) spaced apart from one another and articulated on said sprung mass (7) and fourth ends (64, 65) opposite respective said third ends (62, 63) around a second common axis (D).

5. The suspension according to claim 1, wherein said first lever (100) defines a housing seat (130) for at least a portion of said second lever (140); and
wherein said first and second levers (100, 140) are hinged to one another around a third axis (L).

6. The suspension according to claim 5, wherein said first lever (100) is trapezoidal and further comprises:
a pair of first arms (101) having respective fifth ends (102) articulated on said sprung mass (7) around a fourth common axis (H) and respective sixth ends (104) articulated on said unsprung mass (6) around a fifth common axis (I); and at least one second arm (105) transversely interposed between said first arms (101) and articulated on said unsprung mass (6) around said third axis (L).

7. The suspension according to claim 1, wherein the suspension further comprises:
a bushing (92, 150) fixed to said first lever (70, 100);
a joint (95, 151) fixed to said second lever (85, 140) and mounted in a rotary manner on said bushing (92, 150); and
an element (96, 154) at least partly made of an elastomer material and radially interposed between said joint (95, 154) and said second lever (85, 140).

8. The suspension according to claim 1, wherein the suspension further comprises:
a movable plate (38);
an elastic element (37) interposed between said movable plate (38) and said second element (19); and
an actuator (40) interposed between said shock absorber (20, 21) and said sprung mass (7) and controllable so as to adjust a position of said sprung mass (7) relative to the ground.

9. A motor vehicle comprising:
said unsprung mass (6) comprising, in turn, a pair of first wheels (4) arranged, in use, at a front of the motor vehicle (1);
said sprung mass (7) comprising, in turn, a pair of second wheels (5) arranged, in use, at a back of the motor vehicle (1);
the suspension (8, 9) according to claim 1 arranged, in use, at the front and interposed between respective first wheels (4) and a body (2) of the motor vehicle (1) and at the back and interposed between respective second wheels (5) and said body (2);
said motor vehicle (1) further comprising:
a control unit (300);
a plurality of first accelerometers (313, 314, 315) configured to generate respective first signals (ay, ay, az) associated with an acceleration of said body (2) according to a fifth axis (X) parallel to a normal forward moving direction of said motor vehicle (1), according to a sixth axis (Y) orthogonal to said fifth axis (X) and arranged, in use, horizontally and according to a third axis arranged, in use, vertically and orthogonal to said fifth and sixth axis (X, Y);
a plurality of second accelerometers (320, 321, 322, 323) configured to generate second signals ($a_4$, $a_{4'}$, $a_5$, $a_{5'}$) associated with accelerations of the respective first and second wheels (4, 5);
a plurality of first sensors (330, 331, 332, 333) configured to generate third signals ($s_4$, $s_{4'}$, $s_5$, $s_{5'}$) associated with positions of the respective first and second wheels (4, 5);

a second sensor (340) configured to generate a fourth signal ($\gamma'$) associated with the time variation of a yaw angle of said motor vehicle (1) around said third axis (Z); and
wherein the control unit (300) is programmed to control said driving member
(22) based on said first signals ($a_y$, $a_{y'}$, $a_z$), on said second signals ($a_4$, $a_{4'}$, $a_5$, $a_{5'}$), on said third signals ($s_4$, $s_{4'}$, $s_5$, $s_{5'}$) and on said fourth signal ($\gamma'$).

10. The motor vehicle according to claim 9, further comprising a cooling circuit (400) designed to cool said driving member (22);
said cooling circuit (400) comprising:
a heat exchanger (401) carried by said sprung mass (7) and designed to cool a heat transfer fluid coming, in use, from said driving member (22);
a first duct (402) interposed between said heat exchanger (401) and said driving member (22) and designed to cause said heat transfer fluid to flow from said heat exchanger (401) to said driving member (22) at a first temperature; and
a second duct (403) interposed between said heat exchanger (401) and said driving member (22) and designed to cause said heat transfer fluid to flow from said driving member (22) to said heat exchanger (401) at a second temperature, which is higher than said first temperature;
each one of said first and second ducts (402, 403) comprising:
a respective first segment (410) fixed to said unsprung mass (6) and at least partly U-bent; and
a respective second segment (411) fixed to said sprung mass (7).

11. The motor vehicle according to claim 9, further comprising:
a power source (500) designed to power said driving member (22) with electrical energy; and
a pair of electric cables (501, 502) interposed between said power source (500) and said driving member (22) and designed to electrically transmit power from the power source to the driving member (22);
each electric cable (501, 502) comprising, in turn:
a respective third segment (510) fixed to said unsprung mass (6);
a respective fourth segment (511) fixed to said sprung mass (7); and
a respective fifth segment (514) connecting said third segment (510) and said fourth segment (511).

* * * * *